Dec. 29, 1959 V. C. SMITH 2,918,740
ONE-WAY ROAD-BLOCK FOR AUTOMOBILE ENTRANCE
OR EXIT DRIVEWAYS TO OR FROM DRIVE-IN
THEATRES, PARKING AREAS AND THE LIKE
Filed Jan. 28, 1957 2 Sheets-Sheet 1

INVENTOR.
VIGOR CRANSTON SMITH
BY
ATTORNEY.

Dec. 29, 1959 V. C. SMITH 2,918,740
ONE-WAY ROAD-BLOCK FOR AUTOMOBILE ENTRANCE
OR EXIT DRIVEWAYS TO OR FROM DRIVE-IN
THEATRES, PARKING AREAS AND THE LIKE
Filed Jan. 28, 1957 2 Sheets-Sheet 2

INVENTOR.
VIGOR CRANSTON SMITH
BY
Leonard L. Kalish
ATTORNEY.

United States Patent Office 2,918,740
Patented Dec. 29, 1959

2,918,740

ONE-WAY ROAD-BLOCK FOR AUTOMOBILE ENTRANCE OR EXIT DRIVEWAYS TO OR FROM DRIVE-IN THEATRES, PARKING AREAS AND THE LIKE

Vigor Cranston Smith, Strafford, Pa., assignor to Auto Parks, Inc., Devon, Pa., a corporation of New Jersey Application January 28, 1957, Serial No. 636,544

7 Claims. (Cl. 39—5)

The present invention relates to a one-way road-block for automobile entrance-ways for exit driveways to or from drive-in theatres, parking areas or the like.

It is an object of the present invention to provide a road-block in roadways, particularly exit-driveways of drive-in theatres, parking lots and the like, whereby the flow of automobile traffic can be limited to one direction as, for instance, in an outward direction, without any attendants or supervision.

With the above and other objects in view the present invention includes a series of inclined prongs hingedly carried upon springs and deflectible against their springs only in one direction, namely, the direction in which they are inclined, and arranged across the roadway at suitably spaced intervals, and inclined in the direction from which auto traffic is to be barred, and so arranged that the prongs may be depressed by the automobile tire, without any effect upon the travel of the automobile or upon the tire, when the automobile is travelling in the direction towards which the prongs are inclined or in the direction in which the prongs are deflectible, and so that when an automobile travels in the opposite direction, one or the other of the prongs will pierce the tire if the automobile proceeds to drive over or against it.

The present invention further contemplates other novel aspects and features, all as will be more fully pointed out hereinbelow.

In the accompanying drawings in which like reference characters indicate like parts, Figure 1 represents a perspective view of an exit-driveway at the exit point or zone of a drive-in theatre, showing one embodiment of the present invention.

Figure 1:
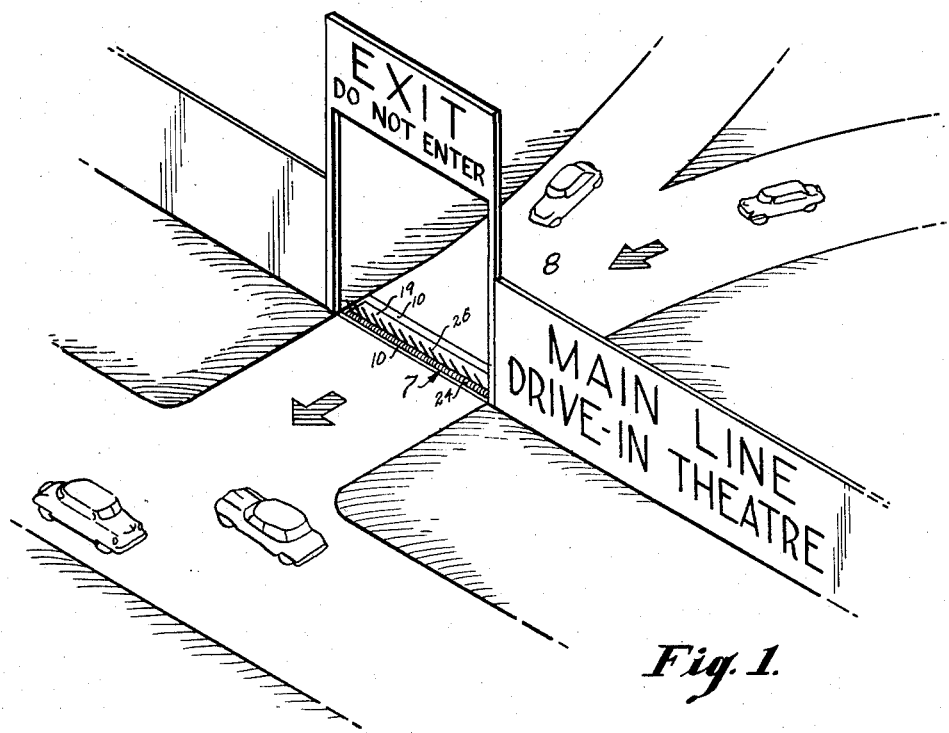
Figure 2:
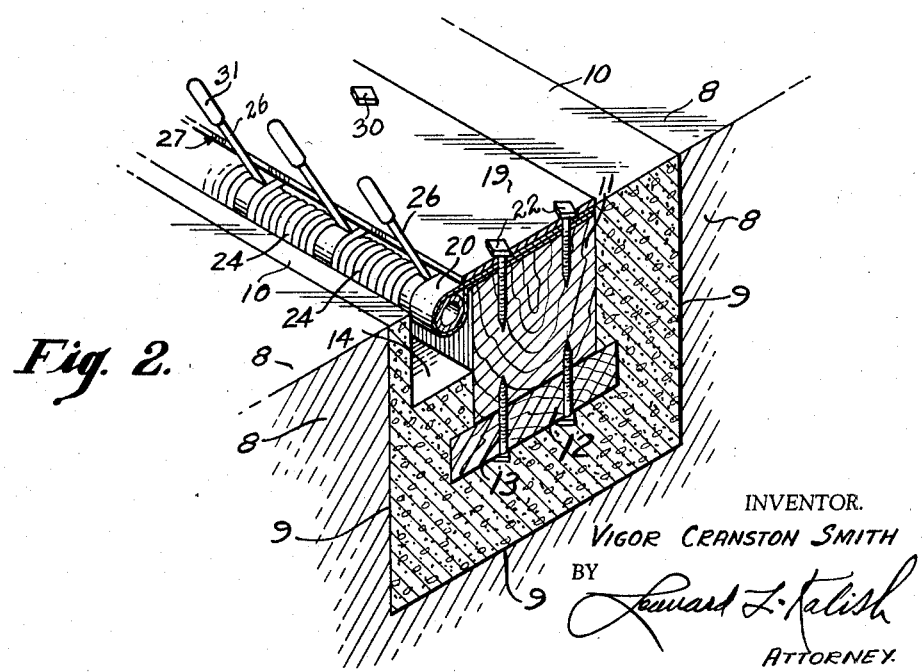
Figure 2 represents a perspective cross-sectional view of one embodiment of the present invention.

At the exit line or zone 7 of the driveway 8, a pit 9 may be formed in and across or transversely of the road-bed of the exit-way, and in this pit 9 a concrete or other suitable support, base or foundation 10 may be formed or provided, as, for instance, by pouring concrete in situ. Before pouring this concrete foundation or base 10, a generally rectangular or other suitably cross-sectioned wooden plank 11 or the like, with a wooden (or other) anchor plate or anchor means 12 secured thereto by bolts 13 (or otherwise), is placed in the pit 9 and supported therein in spaced relation thereto, and a removable core is placed to form a channel or groove 14 adjacent to one side of the plank 11.

The upper surface 16 of the plank 11 is preferably set slightly below the top surface 17 of the concrete base 10, by an amount sufficient to accommodate the pivot-supporting straps or other supporting means 18 beneath the cover-plate 19, and so that the upper surface of the cover-plate 19 will not be much above the top surface of the concrete base 10.

Figure 3:
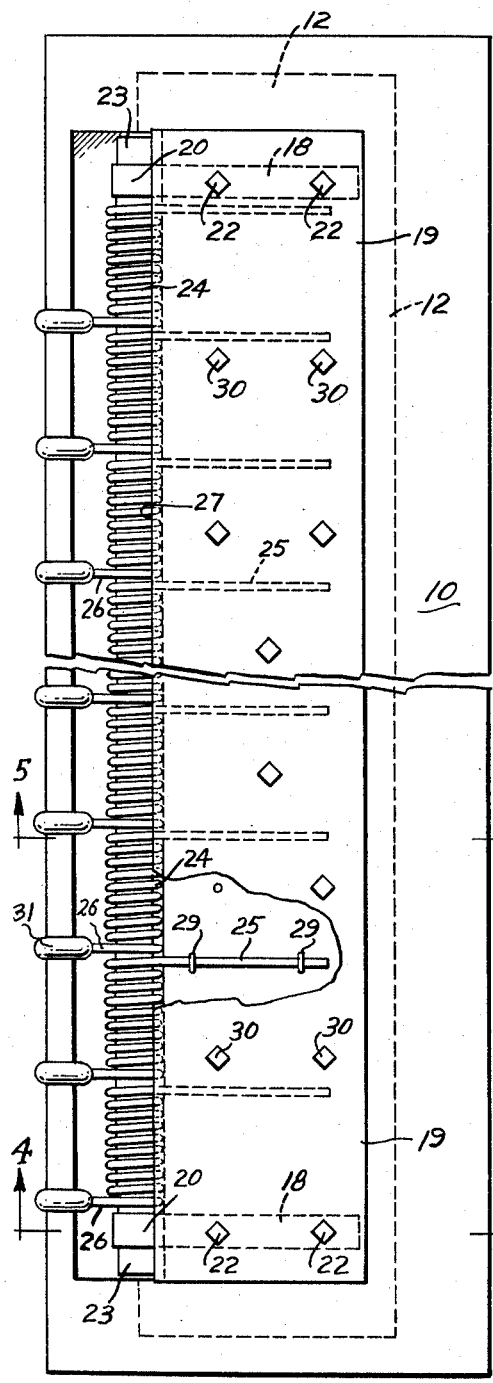
Figure 3 represents a top plan view of the same.

A pair (or more, as for instance three or four) pivot-supporting straps 18 or other supporting means are provided, one at each end, as indicated in Figure 3, and one or more intermediate the ends (although in the illustration shown in Figure 3, a strap is provided only at each of the ends).

Each of the straps 18 may include a more or less circular loop 20, the upper portion of which is generally tangent to or slightly below the pair of horizontal portions 18a and 18b of the strap 18. The straps 18 are provided with holes 21, through which bolts 22 are extended and screwed into the plank 11; these bolts also extending through the cover-plate 19.

Within the loops 20 of the straps 18, a pivot 23 is mounted, which may be in the form of a tube or pipe, and which preferably extends the desired length in one continuous piece.

Between the terminal pivot-supporting loops 20, a plurality of helical springs 24 are mounted upon the pivot-rod or pipe 23, in the manner indicated in Figures 2, 3, 4 and 5. Each spring 24 has an anchorage extension 25 extending outwardly therefrom beneath the cover-plate 19, as indicated in Figures 2, 3, 4 and 5, and has a prong 26 extending from its other end. Thus, the prong 26 is a spring-prong in the sense that it is an integral part of the spring itself, as distinguished from a pivotally-mounted non-resilient projection which may be biased or urged towards its inclined position by a separate spring connected therewith.

The front edge 27 of the cover-plate 19 is so disposed in relation to the pivotal center or pivotal axis of the pivot 23 (and hence in relation to the axis of the helical springs 24) that when prongs 26 are in their rear-most positions, the front edge 27 of the cover-plate 19 acts as a limit on the rearward deflection or position of the prongs 26, and holds the prongs in a forwardly inclined position, as, for instance, the position indicated in Figures 1, 2, 4 and 5.

Figure 4:
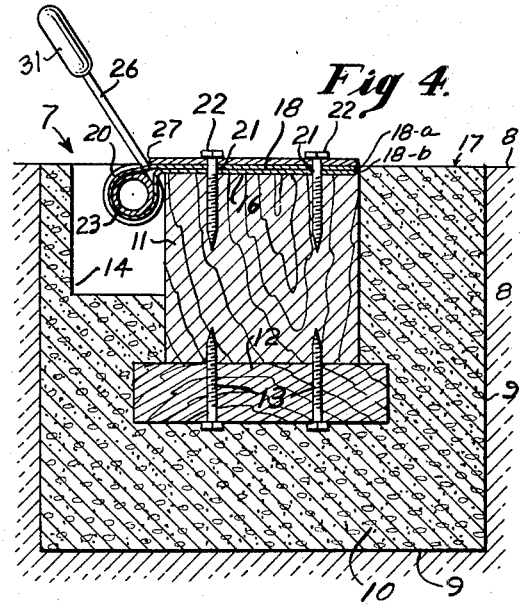
Figure 4 represents a vertical cross-sectional view taken on line 4—4 of Figure 3.
Figure 5:
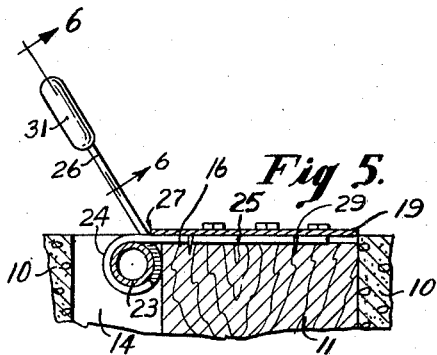
Figure 5 represents a fragmentary cross-sectional view taken on line 5—5 of Figure 3.

In forming the springs with the anchorage extension 25 and prongs 26 thereof, the coils are preferably so wound that the anchorage-extensions 25 and prongs 26 thereof will be generally in the position (or at the angle) relative to each other, as shown, for instance, in Figures 4 and 5.

U-shaped nails or staples 29 may be applied over the anchorage-extensions 25, to keep them from shifting laterally; although this may be omitted.

The cover-plate 19, preferably formed of steel or of the like, may be superimposed upon the straps 18 as well as upon the anchorage-extensions 25, in the manner indicated in the drawings, and fastened by bolts 22 which may also extend through the straps 18 as well as additional bolts 30 which placed at suitable intervals so as firmly to hold down the spring anchorage extensions 25 and firmly to hold down the cover-plate 19, so that the front edge 27 of the cover 19 will be maintained in fixed position and generally immovable, so that it may maintain the prongs 26 in their desired forwardly inclined position.

I may also provide a resilient plastic or rubber-like protective sleeve 31 over thee ends 32 of the prongs 26, vulcanized, welded or otherwise adhesively secured to the prongs 26, either throughout their contiguous surfaces or over the lower portions 33 thereof (indicated by the short cross-lines along the boundary-zone between the prong and the sleeve) while the portion above the so secured zone is free or unadhered so that the sleeve can slide on the outer end 32 of the prong 26.

Figure 6:
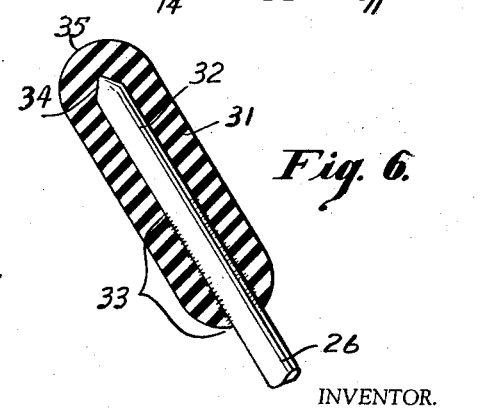
Figure 6 represents a cross-sectional view, on an enlarged scale, on line 6—6 of Figure 5.

The prongs 26 may be pointed, as at 34; although they may be blunt-ended. The plastic or rubber-like sleeve 31 is generally closed at its outer end 35. The sleeve is of sufficient thickness (including also at its outer end 35), that if a person were to walk on it, stumble on it or fall on it, the plastic sleeve would protect the person against contact with the end of the prong itself. However, if an automobile tire were to ride onto the prong in a direction opposite to the direction in which the prong is inclined, the end 35 of the sleeve 31 will be pierced by the end of the prong 26 and will enter the tire and deflate it. If the sleeve is only partly adhered, as shown in Figure 6, the unadhered outer portion thereof may slide down on the prongs and when the car has been backed away (and the prong withdrawn from the tire) the resilient sleeve will tend to slide outwardly on the prong, so as to again cover the end thereof.

The plastic or rubber-like sleeves or covers 31 also have the further function of making the prongs more visible and more quickly noticeable to the driver of an automobile approaching the barrier from the barred direction and also making the prongs more visible and more quickly noticeable to pedestrians intending to walk through or over the barrier.

By incorporating a pigment in the plastic or rubber-like sleeves 31, of some bright or readily noticeable color and perhaps even making them white, will further increase this desired effect. I may also incorporate in this or coat them with a phosphorescent material or a like-reflective material, so as to increase their warning-effect at night and especially when illuminated by the headlight of an automobile.

The tops of the prongs (including the tops of the plastic sleeves) should be no higher than the "road-clearance" of automobiles, so that such of the prongs as are not impressed by the wheels of the automobile passing over the barrier in the permissive direction, will not touch any portion of the bottom of the automobile. The plastic sleeves also serve as an added safeguard against damage to any part of the automobile if, by some chance, an automobile of exceptionally low or small road-clearance passes over the prongs (in the permissive direction).

The plastic sleeves, as indicated above, are preferably made of a somewhat resilient yet form-retaining material. They may be molded separately, with an appropriate hole therein to receive the prong, and thereafter telescoped over the metallic prong and secured thereto by appropriate cement or other adhesive or bonding material placed between the prong and the hole in the sleeve. The sleeve may also be so made that the hole therein is made initially somewhat smaller than the diameter of the prong, so that the sleeve is merely forced over the prong and the sleeve spread slightly, so that the resilient contraction of the sleeve (in a radial direction, throughout its length) will in and of itself secure the sleeve to the prong sufficiently, while yet permitting the removal of the sleeve if it is desired to replace a sleeve on the prong.

I claim the following:

1. A barrier for automobile roadways, for permitting automobiles to travel in one direction but tending to bar their travel in the opposite direction, including a support in the roadway transversely thereof, a plurality of helical springs carried by said support with their axes disposed transversely of the roadway, each of said helical springs having one end thereof projecting above the roadway and constituting a spring-prong and having the other end thereof anchored to said support, said spring-prongs being spaced at suitable intervals transversely of the roadway and being normally inclined in the direction from which the travel of automobiles is to be barred and being deflectable downwardly, against the force of the helical spring thereof, to a generally horizontal position, when an automobile rides thereover in the direction in which the spring-prongs point and resisting deflection when a tire of an automobile traveling in the opposite direction bears thereagainst.

2. A barrier for automobile roadways, for permitting automobiles to travel in one direction but tending to bar their travel in the opposite direction, including a plurality of helical springs extending across the roadway at suitable spaced intervals, each of said helical springs having two free ends extending therefrom, one of the free ends of said helical springs forming spring-prongs normally extending substantially above the roadway to a height just short of the road-clearance of the automobiles and being deflectable downwardly, against the spring-force thereof, to a generally horizontal position, when an automobile rides thereover in the direction in which said prongs point and to resist deflection in the opposite direction and a plastic cover enveloping the free ends of said prongs.

3. A barrier for automobile roadways, for permitting automobiles to travel in one direction but tending to bar their travel in the opposite direction, including a plurality of helical springs extending across the roadway at suitable spaced intervals, each of said helical springs having two free ends extending therefrom, one of the free ends of said helical springs forming spring-prongs normally extending substantially above the roadway to a height just short of the road-clearance of the automobiles and being deflectable downwardly, against the spring-force thereof, to a generally horizontal position, when an automobile rides thereover in the direction in which said prongs point and to resist deflection in the opposite direction and light-reflective plastic covers enveloping the free ends of said prongs.

4. A barrier for automobile roadways, for permitting automobiles to travel in one direction but tending to bar their travel in the opposite direction, including a plurality of inclined spring-prongs extending across the roadway at suitable spaced intervals, each of said spring-prongs normally extending substantially above the roadway to a height just short of the road-clearance of the automobiles and being deflectable downwardly, against the spring-force thereof, to a generally horizontal position, when an automobile rides thereover in the direction in which said prongs point and to resist deflection in the opposite direction and luminescent plastic covers enveloping said prongs.

5. A barrier for automobile roadways, for permitting automobiles to travel in one direction but tending to bar their travel in the opposite direction, including a base in the roadway transversely thereof, a plurality of helical springs carried by said base with their axes disposed transversely of the roadway, each of said helical springs having one end thereof projecting above the roadway and constituting a spring-prong and having the other end thereof stationarily anchored in relation to said base, a pivot extending through the helical convolutions of said springs, said anchored ends of said helical springs being disposed below the surface of the roadway, said spring-prongs being spaced at suitable intervals transversely of the roadway and being normally inclined in the direction from which the travel of automobiles is to be barred and being deflectable downwardly against the force of the helical springs thereof, to a generally horizontal position, when an automobile rides thereover in direction in which the spring-prongs point and resisting deflection when a tire of an automobile traveling in the opposite direction bears thereagainst.

6. A barrier for an automobile roadway comprising a support having a planar upper surface, at least one spring member having a helical body portion and outwardly projecting end portions, one of said end portions being anchored to said support and the other of said end portions extending at an acute angle with respect to the plane of said surface of said support and constituting a deflectable barrier-spike, and limiting means operatively connected to said support and normally in engagement with one side of said barrier-spike end-portion to limit movement thereof in one direction, whereby when said barrier is placed in a roadway with said barrier-spike end-portion extending upwardly, movement of a vehicle thereover will be permitted in one direction only.

7. A barrier for automobile roadways for permitting automobiles to travel in one direction but tending to bar their travel in the opposite direction, including an elongated spring-support for mounting in a roadway transversely thereof, said spring-support having a planar upper surface, a plurality of generally co-axial helical springs carried by said spring-support with their axes disposed generally longitudinally of said spring-support, one end of each of said springs being operatively anchored to said support and the other end of each of said springs being free and extending a substantial distance beyond said spring-support and constituting a deflectable spring-prong, means operatively connected with said spring-support and normally in engagement with one side of each of said spring-prongs to limit movement thereof to one direction and to position said spring-prongs at a pre-determined acute angle with respect to the plane of said upper surface of said spring-support when said spring-prongs are not deflected with respect to said anchored spring-ends by any external force, whereby when said barrier is placed in a roadway with said spring-prongs extending upwardly, movement of a vehicle thereover will be permitted in one direction only.

References Cited in the file of this patent

UNITED STATES PATENTS

| | | |
|---|---|---|
| 443,567 | Carr | Dec. 30, 1890 |
| 1,563,637 | Lundblad | Dec. 1, 1925 |
| 2,762,145 | Rupe | Sept. 11, 1956 |